(12) United States Patent
Takahashi et al.

(10) Patent No.: US 6,686,023 B2
(45) Date of Patent: *Feb. 3, 2004

(54) POLISHED-PIECE HOLDER AND MANUFACTURING METHOD THEREOF

(75) Inventors: Katsuji Takahashi, Hikone (JP); Hirokazu Hiraoka, Shiga-ken (JP); Masayuki Noda, Hikone (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/082,683

(22) Filed: Feb. 25, 2002

(65) Prior Publication Data

US 2002/0160150 A1 Oct. 31, 2002

(30) Foreign Application Priority Data

Feb. 26, 2001 (JP) ........................................ 2001-049653

(51) Int. Cl.$^7$ ........................... B32B 27/12; B32B 27/04
(52) U.S. Cl. ....................... 428/141; 442/281; 442/110; 442/117; 442/148; 442/164; 442/168; 442/169; 442/172; 442/175; 442/180; 442/268; 442/277; 442/278
(58) Field of Search .................. 428/141; 442/281, 442/110, 117, 148, 164, 168, 169, 172, 175, 180, 268, 277, 278

(56) References Cited

U.S. PATENT DOCUMENTS

| 6,291,373 | B1 | | 9/2001 | Sakaguchi et al. .......... 442/156 |
| 6,566,286 | B1 | * | 5/2003 | Sakaguchi et al. .......... 442/281 |

* cited by examiner

Primary Examiner—Harold Pyon
Assistant Examiner—Patricia L. Nordmeyer
(74) Attorney, Agent, or Firm—Pearne & Gordon LLP (57) ABSTRACT

A polished-piece holder is provided that does not easily stick or adsorb to a polishing pad of a polishing apparatus and reduces occurrences of production line troubles and therefore the number of failed polished pieces. A single sheet of a thermosetting resin impregnated fiber substrate or a laminated sheet formed by laminating a plurality of sheets of the thermosetting resin impregnated fiber substrate is formed under heat and pressure into a plate. The thermosetting resin impregnated fiber plate is then processed to form a polished-piece holder for holding pieces to be polished. The evaluation portion has a certain length in a direction of the average line. The thermosetting resin impregnated fiber plate has a surface roughness with a maximum wave height Ry of 10 μm or greater over an almost entire area of the surface layer. The maximum wave height Ry is determined in an evaluation portion of a wave curve by summing a height Rp of a highest crest and a depth Rv of a deepest trough from an average line of the wave curve. The wave curve is taken from a cross-sectional curve obtained by the surface roughness measuring device.

5 Claims, 3 Drawing Sheets

POLISHED-PIECE HOLDER AND MANUFACTURING METHOD THEREOF

BACKGROUND OF THE INVENTION

The present invention relates to a polished-piece holder and more particularly to a holder for holding a piece to be polished (hereinafter referred to as "polished piece"), such as a silicon wafer and hard disk, and also to a method of manufacturing the polished-piece holder.

A process of manufacturing silicon wafers and hard disks includes a step of polishing surfaces of polished pieces such as silicon wafers and hard disks. The polished pieces are held in the polished-piece holder for polishing operations. The polished-piece holder is shaped like a disk which has a gear formed on its outer circumference for driving it to rotate and also has one or more through-holes in which to fit and hold the polished pieces. The polished-piece holder with one or more polished pieces fitted in the through-holes is mounted in a polishing apparatus. The polished-piece holder is rotated in a plane including the surface of the disk while being driven in a planetary motion about a sun gear of the polishing apparatus as a center.

General conventional polished-piece holders are made by processing a disk formed of a laminated plate impregnated with thermosetting resin. Among the thermosetting resin impregnated laminated plates are a laminated plate of a glass fiber fabric substrate impregnated with epoxy resin, a laminated plate of an aramid fiber nonwoven fabric substrate impregnated with epoxy resin, and a laminated plate of cotton cloth substrate impregnated with phenol resin. The resin to be impregnated is generally a thermosetting resin not containing inorganic or organic particles.

U.S. Pat. No. 6,291,373 discloses a technique for manufacturing a polished-piece holder which involves impregnating an aramid fiber nonwoven fabric substrate with epoxy resin and drying it to form prepregs, laminating one or more prepregs to form a laminated sheet, and molding it under heat and pressure into the holder.

In performing the polishing operation, the polished-piece holder is mounted on the polishing apparatus and the polished pieces are fitted in the through-holes of the polished-piece holder. Then, a water-based polishing liquid having silica ($SiO_2$), alumina ($Al_2O_3$) and ceria ($CeO_2$) dispersed therein is supplied onto the surfaces of the polished pieces while rotating the holder and a polishing pad (held in an upper block of the polishing apparatus) arranged on the surfaces of the polished pieces relative to each other to polish the surfaces of the polished pieces.

When the polished-piece holder is to be mounted on or dismounted from the polishing apparatus as during the polished-piece holder replacement, this is done manually or by an automated machine. In recent years, this replacement operation is often performed by an automated machine. The removal of the polished pieces from the holder and the installing of unprocessed polished pieces on the holder are being performed by an automated machine with increasing frequency.

The polishing operation uses a water-based polishing liquid as described above, so that the polished-piece holder is likely to adhere to the polishing pad of the polishing apparatus through the water-based polishing liquid. As a result, when the upper block is lifted to take out the polished pieces from the holder or to replace the holder, the polished-piece holder may remain sticking to the polishing pad and be lifted together with the pad or even the polished pieces may be lifted up together with the holder. Such an incident may not pose a serious problem when the mounting or dismounting of the polished-piece holder and the removal or installing of the polished pieces are performed manually. When these operations are done by an automated machine, however, such an incident will cause the production line to stop.

It is therefore an object of the present invention to provide a polished-piece holder which does not easily adsorb or stick to a polishing pad of a polishing apparatus.

Another object of the present invention is to provide a polished-piece holder which can diminish possibilities of failure of polished pieces due to production line troubles.

Still another object of the present invention is to provide a polished-piece holder which can enhance an efficiency of a polishing operation.

A further object of the present invention is to provide a method of manufacturing a polished-piece holder which does not easily adhere or stick to a polishing pad of a polishing apparatus.

SUMMARY OF THE INVENTION

The present invention relates to an improvement on a polished-piece holder formed from a thermosetting resin impregnated fiber plate with a surface layer. The fiber plate comprises a single sheet of thermosetting resin impregnated fiber substrate or a laminated sheet formed by laminating a plurality of sheets of thermosetting resin impregnated fiber substrate. The single sheet or laminated sheet is heated and pressurized to form the fiber plate.

The thermosetting resin impregnated fiber plate used in this invention is characterized in that the surface layer has over its almost entire area a surface roughness with a maximum wave height Ry of 10 μm or greater. The maximum wave height Ry is determined in an evaluation portion of a wave curve by summing a height Rp of a highest crest and a depth Rv of a deepest trough or valley from an average line of the wave curve. The evaluation portion has a certain length in a direction of the average line. The wave curve is taken from a cross-sectional curve obtained by a surface roughness measuring device.

It is considered that the cross-sectional curve obtained by the surface roughness measuring device comprises a "surface waviness curve" or a "wave curve" with a low frequency, i.e., a long wavelength, and a "roughness curve" with a short wavelength, i.e., a high frequency, which is obtained by removing the wave curve component from the cross-sectional curve. Generally, the wavelength of the wave curve is 30 to 100 times that of the roughness curve.

The "average line" of the wave curve means an imaginary straight line as a centerline along which a converted wave curve extends. The converted curve is obtained by converting the wave curve in such a manner that the converted wave curve extends along the centerline. The evaluation portion having a certain length in the direction of the average line and extracted from the wave curve needs to be long enough for the state of the surface layer to be measured correctly. It is generally said that the evaluation portion preferably has a length four or five times the cutoff value that is set when the measurement is made by the surface roughness measuring device.

The "crest" in the wave curve is that portion of the curve situated between adjoining two of a plurality of intersections between the average line and the wave curve which lies above the average line. The "trough" in the wave curve is that portion of the curve situated between adjoining two of a plurality of intersections between the average line and the wave curve which lies below the average line.

In making the polished-piece holder, the use of the thermosetting resin impregnated fiber plate whose surface layer has the maximum wave height Ry—a parameter used to evaluate the surface roughness—of 10 μm or higher over an almost entire area offers an advantage of being able to prevent the polished-piece holder from easily adhering or sticking to the polishing pad of the polishing apparatus without affecting the polishing result. An upper limit of this parameter is a value that does not adversely affect the polishing operation on the polished pieces. This value varies depending on the material and surface state of the polishing pad used in the polishing apparatus and on the property of the water-based polishing agent. Studies conducted by this inventor have found that the maximum wave height Ry ranging from 10 μm to 30 μm, both inclusive, leads to a satisfactory polishing result almost without being affected by the material and surface state of the polishing pad and the property of the water-based polishing agent.

The reason that the above-described effects can be produced may be explained as follows. In a polished-piece holder whose surface has a surface roughness (wave or large undulation) satisfying the above-described parameter, an area in which the surface layer of the polished-piece holder comes into intimate contact with the polishing pad is smaller than that of a polished-piece holder with a smaller parameter. Between the polishing pad and the surface layer of the polished-piece holder there are considered to be very small gaps due to the wave of the surface layer. The adhering force (sticking force) varies according to the locations of crests and troughs of the wave and is uneven over the entire surface layer. Hence, comparison made between the force with which the polished-piece holder of this invention adheres to the polishing pad and the force with which the conventional polished-piece holder adheres to the polishing pad shows that the polished-piece holder with a waved surface has a reduced adhesion force over the entire area of the surface layer. At locations where the adhesion force is small, the polished-piece holder and the polishing pad easily part from each other, thus preventing the polished-piece holder from easily sticking to the polishing pad.

It should be noted, however, that simply forming in the surface layer of the polished-piece holder undulations (frosting pattern) of such a short wavelength as is included in the above-described roughness curve cannot practically form gaps between the polishing pad and the polished-piece holder that can reduce the adhering force. In this case, therefore, the areas with a reduced adhering force are not dispersedly or dottedly present over the entire area of the surface layer of the polished-piece holder, making it impossible to fully prevent the polished-piece holder from sticking to the polishing pad.

The average interval between adjoining two of a plurality of peaks of the crests included in the evaluation portion of the wave curve does not need any particular limitation unless it is extremely narrowed or broadened to such an extent as will nullify the effects of the present invention. Considering the mass production and the desirable effects, the average interval falls preferably in between 15 mm and 17 mm, both inclusive. When this preferable result was obtained, the surface roughness measuring device was set at a scan length of 100 mm, a scan speed of 1 mm/second, a stylus load of 15 mg and a cutoff value of 25 mm for extracting the wave curve from the cross-sectional curve.

The internal structure of the thermosetting resin impregnated fiber plate has no particular limitations. It is known, however, that more preferable results are obtained if the thermosetting resin impregnated fiber plate is constructed of an inner layer comprising one or more fiber substrates made of woven fabric and a pair of outer layers arranged on both sides of the inner layer and formed of one or more fiber substrates of nonwoven fabric, and if the thermosetting resin to be impregnated is an epoxy thermosetting resin.

There are no particular limitations on the fiber substrates as long as they are fiber substrates that can form a polished-piece holder, such as woven fabric or nonwoven fabric of glass fiber or aramid fiber or cotton cloth. However, for the polished-piece holder made from a fiber substrate using organic fibers, this invention offers a significant effect of preventing the holder from sticking to the polishing pad. This is because the organic fiber such as aramid fiber is light compared with glass fiber and cotton and, if the thermosetting resins impregnated into the fiber substrates are the same and the adhering forces generated between the polished-piece holders and the polishing pad are equal, the polished-piece holder made from aramid fibers is more likely to remain adhering to the polishing pad because of its reduced weight.

The possible thermosetting resins to be impregnated into the fiber substrates include phenol resin, epoxy resin, polyester and polyimide. However, there are no particular limitations on the thermosetting resins. It is noted that thermosetting resins with relatively high heat resistance, such as phenol resin and polyimide (e.g., resins having parts not directly involved in adhesion, such as benzene nuclei, in molecular skeletons at high density) have relatively low adhesive force so that, although the resins themselves are hard, they easily separate from the substrate at interfaces during polishing and also easily break or wear. Considering these, it is preferred that epoxy resin be used as the thermosetting resin.

In the method of manufacturing a polished-piece holder by using a thermosetting resin impregnated fiber plate according to this invention, a single sheet of thermosetting resin impregnated fiber substrate or a laminated sheet formed by laminating a plurality of sheets of thermosetting resin impregnated fiber substrate is prepared. According to the polishing conditions, such as the kind and thickness of polished pieces, the number of laminated sheets of the fiber substrate may be changed. Next, a pair of release films are arranged on both sides of the single sheet or laminated sheet. Then, a pair of mirror plates are arranged on both sides of the paired release films. Then, finally, the single sheet or laminated sheet is applied with heat and pressure between press platens from both sides of the mirror plates. In the method of this invention, at least the mirror plate arranged on the surface layer side is so constructed as to provide a surface roughness with a maximum wave height Ry of 10 μm or greater over the entire area of the surface layer of the thermosetting resin impregnated fiber plate. The maximum wave height Ry is determined in an evaluation portion of a wave curve by summing a height Rp of a highest crest and a depth Rv of a deepest trough from an average line of the wave curve. The wave curve is taken from a cross-sectional curve obtained by the surface roughness measuring device. More specifically, the magnitude of wave (maximum height and wavelength) can be determined according to the material (hardness in particular) and thickness of the mirror plate. In other words, to provide the surface layer with waves or undulations with the maximum height Ry of 10 μm or higher, an aluminum mirror plate is selected that meets the requirements on the hardness and/or thickness of aluminum material.

The mirror surface of the mirror plate has virtually no wave or surface roughness before being subjected to heat and pressure. With the hardness and thickness of the mirror plate properly selected, a heating and pressurizing process causes the surface of the mirror plate to deform by the flow of thermosetting resin impregnated in the single sheet or laminated sheet and also by the expansion and deformation of the mirror plate due to heat and pressure. This deformation is considered to form waves in the surface layer of the thermosetting resin impregnated fiber plate. Assuming that the pressurizing forces are equal, when the mirror plate is increased in hardness and thickness, the waves formed on the surface tend to have a lower maximum wave height Ry and a longer wavelength. Conversely, when, under the same pressurizing force, the mirror plate is decreased in hardness and thickness, the waves formed tend to have a higher maximum height Ry and a shorter wavelength. When conditions other than the pressurizing force are the same, the maximum height Ry increases with an increasing pressurizing force and decreases with a decreasing pressurizing force. By taking this phenomenon into consideration, the hardness and thickness of the mirror plate are determined. The mirror plate, once used, is formed with waves on its surface. In the subsequent manufacturing process, a repetitive use of the used mirror plates can produce the similar effect of transferring the surface waves of the mirror plates onto the surfaces of the single sheet or laminated sheet. It is therefore possible to form waves on the surface layer of the thermosetting resin impregnated fiber plate with a certain level of reproducibility.

In more concrete terms, the hardness and/or thickness of the mirror plate are determined in such a way that the maximum wave height Ry falls between 10 $\mu$m and 30 $\mu$m, both inclusive and that the average interval of adjoining two of a plurality of peaks included in the evaluation portion of the wave curve is in a range of 15 mm to 17 mm, both inclusive. While the material of the mirror plate is arbitrary, our tests have found that aluminum mirror plates produce satisfactory results.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE INVENTION

The following sheets of sheet-like fibrous substrates or fiber substrates were prepared.

Substrate 1: Aramid Fiber Nonwoven Fabric Substrate

A number of chops (1.5 D (denier) in diameter and 3 mm in length; "Technora (trade name)" by Teijin Ltd.) of para-aramid fiber (poly-p-phenylene 3,4-diphenyl ether terephthalamide fiber) were spread in plane and sprayed with a water-soluble epoxy resin binder (with a glass-transition temperature of 110° C.) and then dried by heating to manufacture a nonwoven fabric with a unit weight of 60 g/m$^2$. A compounding ratio by weight of para-aramid fiber to resin binder is 90/10.

Substrate 2: Aramid Fiber Nonwoven Fabric Substrate

A number of chops (1.5 D (denier) in diameter and 3 mm in length; "Kevlar(trade name)" by Du Pont Ltd.) of para-aramid fiber (poly-p-phenylene terephthalamide fiber) were spread in plane and sprayed with a water-soluble epoxy resin binder (with a glass-transition temperature of 110° C.) and then dried by heating to manufacture a nonwoven fabric with a unit weight of 60 g/m$^2$. A compounding ratio by weight of para-aramid fiber to resin binder is 90/10.

Substrate 3: Polyester Fiber Fabric Substrate

A fabric with a weaving density of 48 warps/48 woofs and a unit weight of 130 g/m$^2$ ("BKE Poplin (trade name)" by Asahi Chemical Industry Co., Ltd.).

The following prepregs were prepared.

First, bisphenol A epoxy resin varnish compounded with dicyandiamide as a curing agent and 2-ethyl-4-methylimidazole as a cure promoter was prepared.

The three fiber substrates 1 to 3 described above were impregnated with varnish and dried by heat to manufacture prepregs A to C. The amount of the impregnating resin used for each of the prepregs A to C was adjusted so that each of the prepregs A to C after being formed under heat and pressure was 0.1 mm thick. These prepregs are designated as follows.

Prepreg A: Fiber substrate 1=Aramid (Technora) nonwoven fabric

Prepreg B: Fiber substrate 2=Aramid (Kevlar) nonwoven fabric

Prepregs C: Fiber substrate 3=Polyester fabric

The following mirror plates were prepared.

Aluminum Mirror Plate MP1: Material A5182P-H38

The mirror plates prepared have a Brinell hardness of 77 (HBS10/500) and are 0.4 mm, 1.0 mm and 1.2 mm thick, respectively.

Aluminum Mirror Plate MP2: Material A1050P-H18

This mirror plate has a Brinell hardness of 46 (HBS10/500) and a thickness of 0.4 mm.

Stainless Steel Mirror Plate MP3: Material SUS301HT-2

This mirror plate is 1.2 mm thick and has a Brinell hardness of 165 (HBS10/500).

EXAMPLE 1

Figure 1:
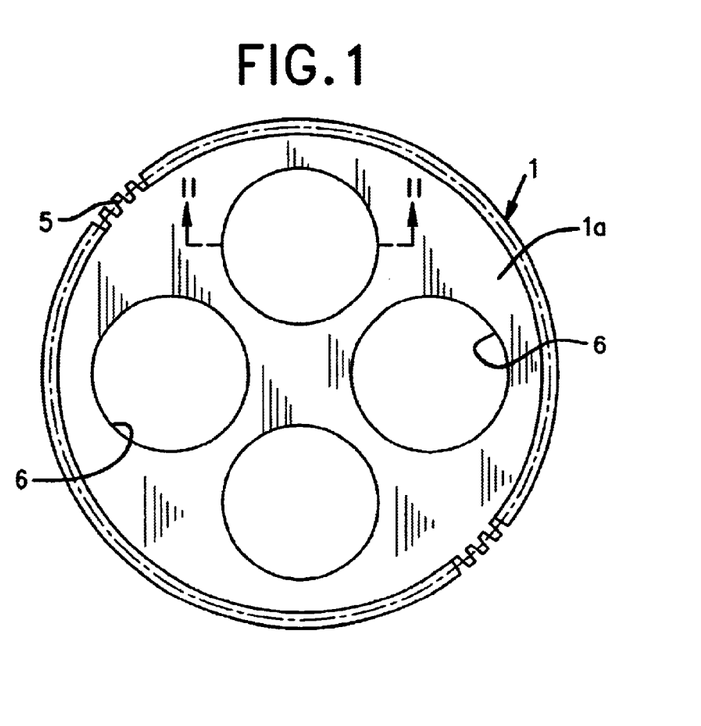
FIG. 1 is a plan view showing a polished-piece holder of the present invention.
Figure 2:
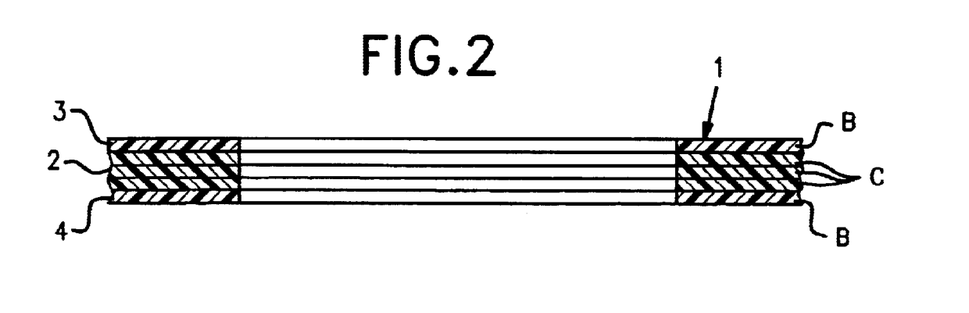
FIG. 2 is a sectional view taken along line II—II of FIG. 1.

FIG. 1 is a plan view of a holder 1 for holding polished pieces according to Example 1. FIG. 2 is a cross-sectional view taken along the line II—II of FIG. 1. The holder 1 of Example 1 is formed from five prepregs. That is, the holder 1 comprises an inner layer 2 having three laminated prepregs C, and outer layers 3 and 4, each comprising prepreg B. The outer layer 3 is arranged on one side of the inner layer 2 and the outer layer 4 arranged on the other side of the inner layer 2 with respect to the laminating direction. This holder 1 is shaped like a disc of about 10 inches (25.4 cm) in diameter with a gear 5 formed on its outer circumference. The holder 1 has four through-holes 6 about 3.5 inches (8.9 cm) across, in each of which a polished piece is fitted.

The holder 1 is manufactured as follows. First, the three prepregs C are laminated and the prepregs B are arranged, one on each side of the stacked prepregs C with respect to the laminating direction to form a laminated sheet. Then, on each side of the laminated sheet with respect to the laminating direction, an aluminum mirror plate MP10.4 mm thick is placed through a release film (polypropylene film 50 $\mu$m thick) to form a laminated body. A plurality of laminated bodies thus formed are stacked together and cushion members made of craft paper each 10 mm thick are arranged on both sides of the stacked laminated bodies. The laminate formed in this manner is placed between a pair of press platens and subjected to heat and pressure to form a thermosetting resin impregnated fiber plate 0.5 mm thick. The heating temperature during the pressing operation is about 165° C. at maximum and the unit pressure is 4 Mpa. This plate is punched with four holes and formed with a gear on its outer circumference.

EXAMPLE 2

By laminating five prepregs A together and performing processing in the same way as in Example 1 in other respects, a holder with a thickness of 0.5 mm was fabricated.

EXAMPLE 3

By using the aluminum mirror plates MP2 0.4 mm thick and performing processing in the same way as in Example 1 in other respects, a holder 0.5 mm thick was fabricated.

EXAMPLE 4

By using the aluminum mirror plates MP2 0.4 mm thick, setting the unit pressure to 5 Mpa and performing processing in the same way as in Example 1 in other respects, a holder 0.5 mm thick was fabricated.

EXAMPLE 5

By using the aluminum mirror plates MP2 0.4 mm thick, setting the unit pressure to 6 Mpa and performing processing in the same way as in Example 1 in other respects, a holder 0.5 mm thick was fabricated.

COMPARATIVE EXAMPLE 1

By using the aluminum mirror plates MP1 1.2 mm thick and performing processing in the same way as in Example 1 in other respects, a holder 0.5 mm thick was fabricated.

COMPARATIVE EXAMPLE 2

By using the aluminum mirror plates MP2 1.2 mm thick and performing processing in the same way as in Example 2 in other respects, a holder 0.5 mm thick was fabricated.

COMPARATIVE EXAMPLE 3

By using the aluminum mirror plates MP1 1.0 mm thick and performing processing in the same way as in Example 2 in other respects, a holder 0.5 mm thick was fabricated.

COMPARATIVE EXAMPLE 4

By using the stainless steel mirror plates MP3 1.2 mm thick in place of the aluminum mirror plates and performing processing in the same way as in Example 1 in other respects, a holder 0.5 mm thick was fabricated.

COMPARATIVE EXAMPLE 5

By using the stainless steel mirror plates MP3 1.2 mm thick in place of the aluminum mirror plates and performing processing in the same way as in Example 2 in other respects, a holder 0.5 mm thick was fabricated.

COMPARATIVE EXAMPLE 6

By using the stainless steel mirror plates MP3 1.2 mm thick in place of the aluminum mirror plates, using as release films roughened films 50 $\mu$m thick which have undergone sand mat processing on one side, and performing processing in the same way as in Example 2 in other respects, a holder 0.5 mm thick was fabricated.

Using the polished-piece holders of the Examples 1 to 5 and Comparative examples 1 to 6 described above, polishing operations were performed. Polished pieces are 3.5-inch aluminum hard disks. A measure of how firmly the polished-piece holder adheres to a polishing pad of the polishing apparatus is given by the number of times that the holder adhering to the polishing pad is lifted together with the pad (number of troubles). The results of evaluations on the level of adherence of the holder to the polishing pad and also on a service life of the holder are shown in Table 1. Table 1 also shows a surface waviness (maximum height Ry) and a surface roughness (Rz) measured by a surface roughness meter for each of the examples and the comparative examples.

TABLE 1

|  | A* | B* | C* | D* |
|---|---|---|---|---|
| Example |  |  |  |  |
| 1 | 15 | 1.5 | 0 | 140 |
| 2 | 10 | 1.7 | 1 | 150 |
| 3 | 20 | 1.6 | 1 | 145 |
| 4 | 25 | 1.7 | 0 | 150 |
| 5 | 30 | 1.6 | 1 | 145 |
| Comparative Example |  |  |  |  |
| 1 | 6 | 1.7 | 10 | 100 |
| 2 | 4 | 1.6 | 14 | 110 |
| 3 | 9 | 1.6 | 5 | 125 |
| 4 | 3 | 1.5 | 18 | 90 |
| 5 | 3 | 1.6 | 20 | 100 |
| 6 | 3 | 3.8 | 20 | 100 |

A*Waviness ($\mu$m)
B*Surface roughness ($\mu$m)
C*Number of troubles
D*Service life The number of troubles represents the number of times that the polished-piece holder was lifted together with the polishing pad in 1000 batch polishing operations (one batch of polishing operation involves installing five polished-piece holders on the polishing apparatus and polishing 20 hard disks). The service life of the polished-piece holder is evaluated by a level of wear of the gear portion. More specifically, the number of times (number of batches) that each of the examples and comparative examples can be used repetitively was checked. The number of batches (service life) with the Comparative example 4, which is identical to a conventional holder, is taken to be 100, and the numbers of batches (service life) for the examples and other comparative examples are shown relative to the number of batches of the comparative example 4. The greater the value of the service life, the longer the service life of the holder under consideration.

Figure 3:
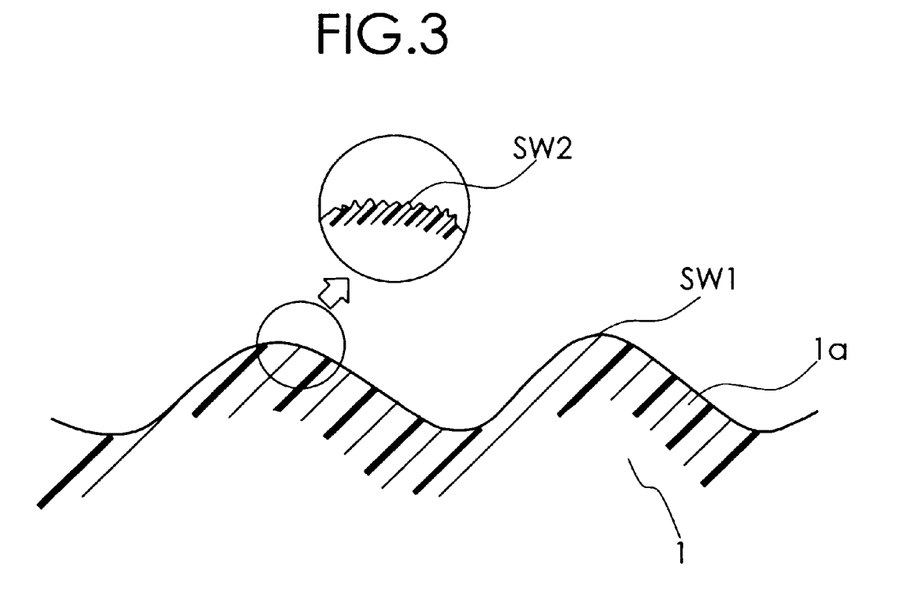
FIG. 3 is an illustration showing the state of a surface layer of a polished-piece holder comprising a thermosetting resin impregnated fiber plate.

FIG. 3 schematically shows a state of a surface layer 1a of the polished-piece holder made of a thermosetting resin impregnated fiber plate. In FIG. 3, SW1 designates a surface roughness or undulation with a long wavelength that appears on the surface layer as a wave constitutes a surface waviness or wave. SW2 designates a surface roughness or undulation with a short wavelength that appears magnified in FIG. 3.

A measuring device and its measuring conditions used in the actual measurement of the waviness are as follows.

Device used: Surface roughness (shape) measuring device, P-1 type (Tencor Instruments make)
Dimensions to be measured: Two dimensions
Scan (trace) length: 100 mm
Stylus load (load acting on a stylus): 15 mg
Repeat (number of traces): 1 time
Cutoff value: 25 mm
Evaluation parameter: Maximum height Ry The cutoff value is defined as a wavelength that corresponds to a frequency at which a phase-compensated high-pass filter has a gain of 50%. The waviness in Table 1 is defined by a maximum wave height Ry. The maximum wave height Ry is determined in an evaluation portion of a wave curve WC by summing a height Rp of a highest crest and a depth Rv of a deepest trough from an average line Av of the wave curve WC. The evaluation portion has a certain length in a direction of the average line Av. The wave curve is taken from a cross-sectional curve measured by the surface roughness measuring device. In this embodiment, the length of the evaluation portion is set equal to the scan length.

Figure 4:
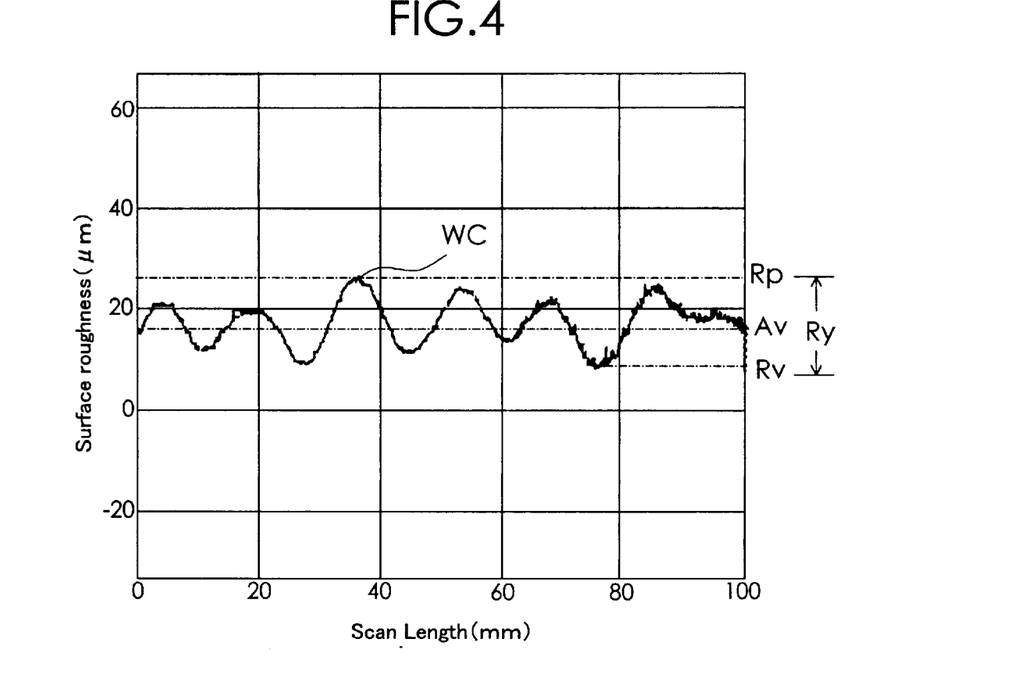
FIG. 4 is an example of an output from a surface roughness measuring device when it is used to measure surface roughnesses of different portions on a surface layer of a polished-piece holder of Example 1 of the present invention.
Figure 5:
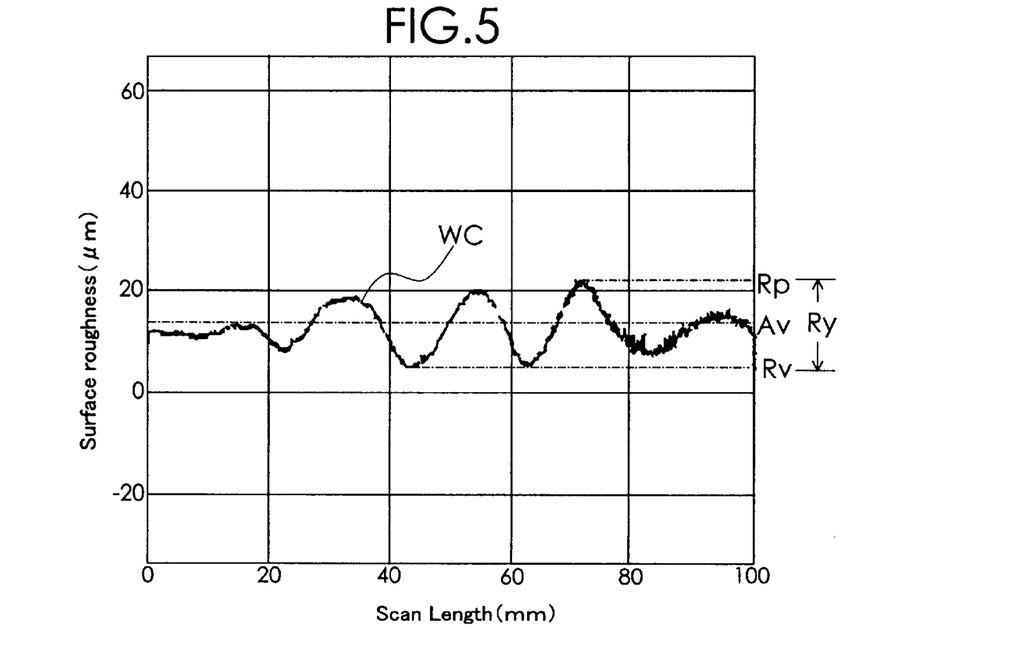
FIG. 5 is another example of an output from a surface roughness measuring device when it is used to measure surface roughnesses of different portions on a surface layer of a polished-piece holder of Example 1 of the present invention.

With the cutoff value of the measuring device set to 25 mm, the measuring device outputs surface roughness data (wave curve WC) with wavelengths longer than 25 mm, which have been converted so as to vary around the average line as a center. Hence, the maximum height Ry of the wave curve can be determined from the output data. FIG. 4 and FIG. 5 show examples of outputs of the surface roughness measuring device when different parts of a surface layer of the example 1 are measured for surface roughness by the measuring device under the conditions described above. The waviness in Table 1 is the value of the maximum height Ry in a portion covering almost an entire area of the surface layer (e.g., central portion).

This value is virtually equal to an average of a plurality of maximum heights Ry measured at a plurality of locations of the surface layer. Based on the output waveforms of FIG. 4 and FIG. 5, an average interval between adjoining two of a plurality of peaks included in the evaluation portion (100 mm) of the wave curve was measured for the examples 1 to 5. The average interval was 15 mm to 17 mm, both inclusive.

A measuring device and its measuring conditions used in measuring the surface roughness are as follows.

Device used: Surface roughness measuring device, P-1 type (Tencor Instruments make)
Scan (trace) length: 4 mm
Stylus load: 10 mg
Repeat (number of traces): 1 time
Cutoff value: 0.8 mm
Evaluation parameter: Rz (10-point average roughness)

The 10-point average roughness is determined as follows. First, from a cross-sectional curve which is removed of wave components longer in wavelength than a predetermined value by a phase-compensated high-pass filter (roughness curve), a portion of the curve of a reference length in the direction of an average line (which is a wave component replaced with a straight line) is extracted. Next, absolute heights of highest five of a plurality of crests in the extracted portion are averaged and absolute depths of deepest five of a plurality of troughs in the extracted portion are averaged. These two averaged values are summed up to determine the 10-point average roughness.

With the cutoff value of the measuring device set at 0.8 mm, the measuring device can produce an output removed of wave components longer in wavelength than 0.8 mm (so-called a roughness curve). The surface roughness shown in Table 1 is a 10-point average roughness in a portion covering almost an entire area of the surface layer (e.g., a central portion).

As can be seen from Table 1, the polished-piece holder of this invention (examples 1 to 5) has a very small number of times that the holder sticks to the polishing pad of the polishing apparatus and is lifted together with the pad. The use of this polished-piece holder results in a reduced number of production line troubles. Further, the polished-piece holder of this invention has little wear, which in turn leads to another advantage of an extended service life. The reason that the presence of waviness in the surface layer of the polished-piece holder extends its service life may be explained as follows. Compared with polished-piece holders having virtually no waved surfaces, the polished-piece holder with a waved surface has a smaller sticking force with which to adhere to the polishing pad. As a result, the load acting on the gear teeth at the start of the polishing operation and during the rotation is reduced, extending the service life of the holder. These advantages can contribute to an improved yield in the piece polishing operation and a substantial cost reduction.

Although, in the examples above, mirror plates with virtually no waviness or surface roughness are used in manufacturing the polished-piece holders, it has been verified in tests that the use of used mirror plates can also produce the similar effects. This means that the mirror plates to be used may be formed in advance with waves similar to those formed on the surface of the polished-piece holder.

In the embodiments above, the mirror plates are formed of aluminum. It is of course possible to use mirror plates made of other materials as long as necessary hardness and thickness can be obtained.

Where cushion members are arranged on both sides of paired mirror plates, it is known that aluminum mirror plates with a thickness of between 0.2 mm and 0.8 mm, both inclusive and a Brinell hardness of between 40 (HBS10/500) and 100 (HBS10/500), both inclusive are preferably used. With such aluminum mirror plates, it is possible to obtain a polished-piece holder whose surface layer has a maximum wave height Ry of between 10 $\mu$m and 30 $\mu$m, both inclusive.

What is claimed is:

1. A polished-piece holder for holding polished pieces, comprising:
    a single sheet of a thermosetting resin impregnated fiber substrate or a laminated sheet formed by laminating a plurality of sheets of the thermosetting resin impregnated fiber substrate;
    wherein the single sheet or the laminated sheetsubstrate is formed under heat and pressure into a thermosetting resin impregnated fiber plate having a surface layer;
    wherein the surface layer has over its almost entire area a surface roughness with a maximum wave height Ry of 10 $\mu$m or greater, the maximum wave height Ry being determined in an evaluation portion of a wave curve by summing a height Rp of a highest crest and a depth Rv of a deepest trough from an average line of the wave curve, the wave curve being taken from a cross-sectional curve obtained by a surface roughness measuring device, the evaluation portion having a certain length in a direction of the average line.

2. A polished-piece holder according to claim 1, wherein the maximum wave height Ry is between 10 $\mu$m and 30 $\mu$m, both inclusive.

3. A polished-piece holder according to claim 2, wherein an average interval between adjoining two of a plurality of peaks of the crests included in the evaluation portion of the wave curve is between 15 mm and 17 mm, both inclusive.

4. A polished-piece holder according to claim 1, wherein the surface roughness measuring device has a scan length of 100 mm, a scan speed of 1 mm/second, a stylus load of 15 mg, and a cutoff value of 25 mm when the wave curve is extracted from the cross-sectional curve.

5. A polished-piece holder according to claim 1, wherein the thermosetting resin impregnated fiber plate comprises an inner layer having one or more fabric sheets of the fiber substrate and a pair of outer layers arranged on both sides of the inner layer, each of the outer layers having one or more nonwoven fabric sheets of the fiber substrate, and the thermosetting resin is an epoxy thermosetting resin.

* * * * *

UNITED STATES PATENT AND TRADEMARK OFFICE
CERTIFICATE OF CORRECTION

PATENT NO. : 6,686,023 B2
DATED : February 3, 2004
INVENTOR(S) : Katsuji Takahasi et al.

It is certified that error appears in the above-identified patent and that said Letters Patent is hereby corrected as shown below:

Title page,
Item [57], ABSTRACT, please delete the ABSTRACT as it currently appears, and insert the following corrected ABSTRACT thereto:
-- A polished-piece holder is provided that does not easily stick or adsorb to a polishing pad of a polishing apparatus. A sheet of a thermosetting resin impregnated fiber substrate is formed under heat and pressure into a plate. The plate is then processed to form a polished-piece holder. The evaluation portion has a certain length in a direction of the average line. The plate has a surface roughness with a maximum wave height Ry of 10 $\mu$m or greater over an almost entire area of the surface layer. The maximum wave height Ry is determined is determined in an evaluation portion of a wave curve by summing a height Rp of a highest crest and a depth Rv of a deepest trough from an average line of the wave curve. The wave curve is taken from a cross-sectional curve obtained by the surface roughness measuring device. --

Column 10,
Line 57, please delete "height Ry of", and insert therefor -- height, Ry, of --.
Line 58, please delete "height Ry being", and insert therefor -- height, Ry, being --.
Line 60, please delete "height Rp of", and insert therefor -- height, Rp, of --.
Lines 60-61, please delete "depth Rv of", and insert therefor -- depth, Rv, of --.
Line 67, please delete "height Ry is", and insert therefor -- height, Ry, is --.

Signed and Sealed this

Tenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,686,023 B2
DATED : February 3, 2004
INVENTOR(S) : Katsuji Takahasi et al.

It is certified that error appears in the above-identified patent and that said Letters Patent is hereby corrected as shown below:

Title page,
Item [57], ABSTRACT, please delete the ABSTRACT as it currently appears, and insert the following corrected ABSTRACT thereto:
-- A polished-piece holder is provided that does not easily stick or adsorb to a polishing pad of a polishing apparatus. A sheet of a thermosetting resin impregnated fiber substrate is formed under heat and pressure into a plate. The plate is then processed to form a polished-piece holder. The evaluation portion has a certain length in a direction of the average line. The plate has a surface roughness with a maximum wave height Ry of 10 $\mu$m or greater over an almost entire area of the surface layer. The maximum wave height Ry is determined in an evaluation portion of a wave curve by summing a height Rp of a highest crest and a depth Rv of a deepest trough from an average line of the wave curve. The wave curve is taken from a cross-sectional curve obtained by the surface roughness measuring device. --

Column 10,
Line 57, please delete "height Ry of", and insert therefor -- height, Ry, of --.
Line 58, please delete "height Ry being", and insert therefor -- height, Ry, being --.
Line 60, please delete "height Rp of", and insert therefor -- height, Rp, of --.
Lines 60-61, please delete "depth Rv of", and insert therefor -- depth, Rv, of --.
Line 67, please delete "height Ry is", and insert therefor -- height, Ry, is --.

This certificate supersedes Certificate of Correction issued August 10, 2004.

Signed and Sealed this

Twenty-eighth Day of December, 2004

JON W. DUDAS
*Director of the United States Patent and Trademark Office*